(12) United States Patent
Meki

(10) Patent No.: US 7,787,982 B2
(45) Date of Patent: Aug. 31, 2010

(54) WORKING SYSTEM, METHOD FOR DETECTING CONTACT, AND ACOUSTIC EMISSION CONTACT DETECTION DEVICE

(75) Inventor: Kazuo Meki, Tsuchiura (JP)

(73) Assignee: Tokyo Seimitsu Co., Ltd., Mitaka-shi (JP)

( * ) Notice: Subject to any disclaimer, the term of this patent is extended or adjusted under 35 U.S.C. 154(b) by 135 days.

(21) Appl. No.: 12/087,705

(22) PCT Filed: Nov. 1, 2006

(86) PCT No.: PCT/JP2006/322310

§ 371 (c)(1),
(2), (4) Date: Jul. 11, 2008

(87) PCT Pub. No.: WO2007/080699

PCT Pub. Date: Jul. 19, 2007

(65) Prior Publication Data

US 2009/0042483 A1    Feb. 12, 2009

(30) Foreign Application Priority Data

Jan. 12, 2006  (JP) .............................. 2006-004939

(51) Int. Cl.
*B29C 39/00* (2006.01)
*B05B 13/02* (2006.01)
*B05B 13/00* (2006.01)
*B24B 49/00* (2006.01)
*B24B 1/00* (2006.01)
*G06F 15/00* (2006.01)
*G05D 23/00* (2006.01)

(52) U.S. Cl. .............................. 700/174; 451/5; 451/6; 451/8; 451/56; 700/55; 700/280; 708/403

(58) Field of Classification Search ................... 451/5, 451/56, 6, 8; 700/174, 55, 279, 280; 708/403
See application file for complete search history.

(56) References Cited

U.S. PATENT DOCUMENTS 2,741,882 A * 4/1956 Straw ........................ 451/127

(Continued)

FOREIGN PATENT DOCUMENTS

JP        63-109977        5/1988

(Continued)

OTHER PUBLICATIONS

International Search Report, dated Dec. 12, 2006, corresponding to PCT/JP2006/322310.

(Continued)

*Primary Examiner*—Ramesh B Patel
*Assistant Examiner*—Thomas H Stevens
(74) *Attorney, Agent, or Firm*—Christie, Parker & Hale, LLP.

(57) ABSTRACT

The object is to aim at the reduction in the influence of noises in an output of an AE sensor in a working machine. In a working system comprising a working device for working a work W by causing a tool 14 to come into contact work W, an AE sensor 21, and an AE signal processing section 22 for processing an AE signal output from the AE sensor, AE signal processing section 22 comprises an A/D converter 33 for converting an AE signal into a digital signal, a frequency analysis section 34 for calculating the frequency characteristics of a digital AE signal, storage sections 35, 37 for storing the frequency characteristics when the tool is not in contact with the work or tool dresser as non-contact frequency characteristics, and a difference calculation section 35 for calculating a difference between the frequency characteristics of the detected digital AE signal and the non-contact frequency characteristics.

23 Claims, 4 Drawing Sheets

U.S. PATENT DOCUMENTS

| | | | |
|---|---|---|---|
| 2,970,412 A * | 2/1961 | Ellis | 451/6 |
| 3,699,720 A * | 10/1972 | Lenning | 451/8 |
| 3,710,082 A * | 1/1973 | Sloane et al. | 700/280 |
| 4,293,913 A * | 10/1981 | Nishimura et al. | 700/185 |
| 4,875,171 A * | 10/1989 | Fujioka et al. | 700/280 |
| 5,107,447 A * | 4/1992 | Ozawa et al. | 702/58 |
| 5,237,779 A * | 8/1993 | Ota | 451/5 |
| 5,618,221 A * | 4/1997 | Furukawa et al. | 451/8 |
| 5,643,050 A * | 7/1997 | Chen | 451/10 |
| 6,361,410 B1 * | 3/2002 | Sakai et al. | 451/56 |
| 6,572,442 B2 * | 6/2003 | Sakai et al. | 451/5 |
| 6,602,110 B2 * | 8/2003 | Yi et al. | 451/9 |
| 6,918,301 B2 * | 7/2005 | Elledge | 73/579 |

FOREIGN PATENT DOCUMENTS

| | | |
|---|---|---|
| JP | 64-40270 | 2/1989 |
| JP | 6-114692 | 4/1994 |
| JP | 2002-66879 | 3/2002 |
| JP | 2002-116016 | 4/2002 |

OTHER PUBLICATIONS

Patent Abstracts of Japan, Publication 63109977 A, Published May 14, 1988, for Kosuge et al.

Patent Abstracts of Japan, Publication 01040270 A, Published Feb. 10, 1989, for Tanabe.

Patent Abstracts of Japan, Publication 06114692 A, Published Apr. 26, 1994, for Hotta et al.

Patent Abstracts of Japan, Publication 2002066879 A, Published Mar. 5, 2002, for Yui et al.

Patent Abstracts of Japan, Publication 2002116016 A, Published Apr. 19, 2002, for Maejima et al.

* cited by examiner

WORKING SYSTEM, METHOD FOR DETECTING CONTACT, AND ACOUSTIC EMISSION CONTACT DETECTION DEVICE

CROSS-REFERENCE TO RELATED APPLICATION

This application is a National Phase Patent Application and claims the priority of International Application Number PCT/JP2006/322310, filed on Nov. 1, 2006, which claims priority of Japanese Patent Application No. 2006-004939, filed on Jan. 12, 2006.

FIELD OF THE INVENTION

The present invention relates to a working system for working a work by causing a tool, such as a grindstone, to come into contact with the work, a method for detecting a contact between a tool and a work or tool dresser, and an acoustic emission (AE) contact detection device having an AE sensor, and more specifically to a technique to detect a contact between a tool and a work by reducing the influence of a surrounding environment.

BACKGROUND OF THE INVENTION

In a working device for working a work by causing a tool to come into contact with the work, specifically in a grinder for grinding a work by causing a rotating grindstone to come into contact with a rotating work, an AE sensor is used to detect a contact between a tool (grindstone) and a work, detect the completion of dressing of a tool (grindstone) by a dressing tool (dresser), position a tool (grindstone) by detecting that the tool has come into contact with a predetermined reference pin, and detect a collision of a tool (grindstone) with other portions of the working device, etc. AE sensors include various types depending on target frequencies, etc., and an AE sensor used in a working device, such as a grinder, targets an ultrasonic region of tens of kilohertz to hundreds of megahertz and comprises a piezoelectric element, etc.

A case in which a work is ground with a grindstone in a grinder is explained below as an example. However, the present invention is not limited to this, and can be applied to any working device for working a work by causing a tool to come into contact with the work. Further, a case where a contact of a grindstone with a work or dresser is detected is explained as an example. However, the present invention is not limited to this and this invention is also available when working or dressing a work with a grindstone in contact with a dresser.

The AE sensor is widely known as described in NDIS No. 2106-79, 2106-91, etc., and a grinder that uses an AE sensor is also widely known as described in patent document 1 etc., and therefore, a detailed explanation of the AE sensor and grinder is omitted. Only a part that directly relates to the present invention is explained.

Generally, a grinder is arranged in a place where other machines, such as another grinder, are arranged, and the influence of noise from other machines is unavoidable. Further, in a grinder, a work or grindstone is rotating even when the grindstone is not in contact with the work or dresser and an AE sensor detects a signal which has a large intensity even if the grindstone is not in contact with the work or dresser, and therefore, it is necessary to detect a contact between the grindstone and the work or dresser in such circumstances. Therefore, among the outputs of the AE sensor, the components in a frequency range that vary when the grindstone comes into contact with the work or dresser are targeted and the components in other frequency ranges are removed to detect the contact. In a conventional AE wave measurement that utilizes an AE sensor in a grinder, the AE signal is separated from frequency components not targeted using an analog filter. Contact is then detected by determining the power of the AE signal in a range of target frequencies.

Patent document 1: Japanese Unexamined Patent Publication (Kokai) No. H6-114692

DISCLOSURE OF THE INVENTION

Noise includes the components of frequencies in a target range, and therefore, is it not possible to sufficiently remove noise only by removing the AE signal and the components of frequencies not in the target range using an analog filter. This resulted in a problem that a contact between a grindstone and a work or dresser could not be detected with sufficient precision.

Further, when the range of target frequencies is wide or divided into a plurality of ranges, it is difficult to provide an analog filter having characteristics corresponding thereto.

The present invention is intended to solve the above problems and an object thereof is to reduce the influence of noise in the output of an AE sensor.

FIG. 1A and FIG. 1B are diagrams for explaining the principle of the present invention. When the frequencies of an AE signal are analyzed, the frequency characteristics thereof will prove to be comparatively stable. As shown in FIG. 1A, the frequency characteristics of an AE signal when a tool comes into contact with a work or tool dresser include signal components resulting from the contact and noise components resulting from causes other than the contact and it can be thought that the noise components do not change before and after the contact. As shown in FIG. 1B, therefore, it is possible to extract only the signal component resulting from the contact by reducing the noise components stored before the contact from the AE signal mixed with noise. In order to calculate the frequency characteristics of the AE signal, it is necessary to carry out frequency analysis processing by converting the AE signal into a digital signal.

In other word, the working system of the present invention is characterized by comprising a working device for working a work by causing a tool to come into contact with the work, an AE sensor provided in the working device, and an AE signal processing section for processing an AE signal output from the AE sensor, wherein the AE signal processing section comprises an A/D converter for converting the AE signal into a digital signal, a frequency analysis section for calculating the frequency characteristics of a digital AE signal, s storage section for storing the frequency characteristics when the tool is not in contact with the work or tool dresser in the working device as non-contact frequency characteristics, and a difference calculation section for calculating a difference between the frequency characteristics of the detected AE digital AE signal and the non-contact frequency characteristics.

According to the working system of the present invention, the frequency characteristics are calculated by carrying out frequency analysis through digital signal processing after converting an AE signal into a digital signal, and therefore, it is possible to store the frequency characteristics. If the non-contact frequency characteristics when a tool is not in contact with a work or tool dresser are stored, and a difference is calculated by subtracting the non-contact frequency characteristics from the frequency characteristics of the detected AE signal, the difference will correctly indicate the amount of change caused by the contact of the tool with the work or tool dresser etc.

It is desirable for the AE signal processing section to further comprise a judgment section for outputting a contact signal by judging that the tool has come into contact with the work or tool dresser based on the difference calculated by the difference calculation section.

If the contact of the tool with the work or tool dresser is judged based on the above difference, it is possible to make a correct judgment.

It is necessary to store the non-contact frequency characteristics when the tool is not in contact with the work or tool dresser and at the same time, it is desirable to make a correct judgment in a state where the work and the tool (grindstone) are rotating. Therefore, the non-contact frequency characteristics should be stored immediately before the tool comes into contact with the work or tool dresser and that they are not in contact. Specifically, when causing the tool to come into contact with the work or tool dresser, the working controller of the working device controls the tool to move relative to the work or tool dresser at a first speed until it reaches a first position where it is ensured that the tool does not come into contact with the work or tool dresser, and then controls the tool to move at a second speed lower than the first speed until it comes into contact with the work or tool dresser, and therefore, the non-contact frequency characteristics should be stored when the tool is about to pass through the first position.

There can be various methods for determine that a tool has come into contact with a work or tool dresser. For example, a difference signal is calculated by subtracting the non-contact frequency characteristics from the frequency characteristics of a detected digital AE signal at a corresponding frequency and then a contact signal is output when the power of the calculated difference signal is greater than a predetermined value.

In the present invention, it is desirable to calculate differences across a wide range of frequencies; however, calculation of the frequency characteristics across a wide range of frequencies will result in the calculation period of time being lengthened. Therefore, it may also be possible to calculate in advance a range of frequencies at which the AE signal considerably changes due to the contact of the tool with the work or tool dresser and then calculate the difference in a predetermined frequency range corresponding thereto or calculate the difference at one or more predetermined frequencies.

Recently, the performance of a digital signal processor (DSP) has improved and it is possible to carry out the above-described frequency analysis in a brief period of time using an inexpensive DSP. When the processing of subtracting the non-contact frequency characteristics from the frequency characteristics of the AE signal is carried out using a digital filter of a DSP, the digital filter will be in charge of storing the non-contact frequency characteristics.

The above features of the present invention also apply to a method for detecting a contact and an AE contact detection device, in which a tool has come into contact with a work or tool dresser is detected in a working device.

According to the present invention, because the change of the frequency characteristics of an AE signal before and after a tool comes into contact with a work or tool dresser can be detected, it is possible to more accurately detect the contact.

In addition to a contact being detected, a change during the period of time of working in a state where a tool is in contact with a work or tool dresser is also detected, it is possible to remove noise components, and therefore, it is possible to more accurately detect the change.

DESCRIPTION OF PREFERRED EMBODIMENTS

Figure 1A:
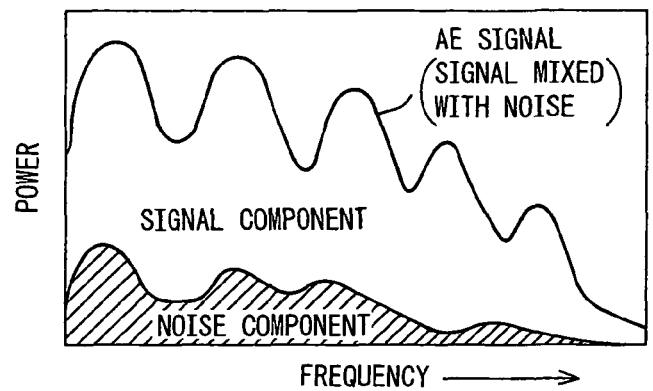
FIG. 1A and FIG. 1B are diagrams for explaining the principle of the present invention.
Figure 1B:
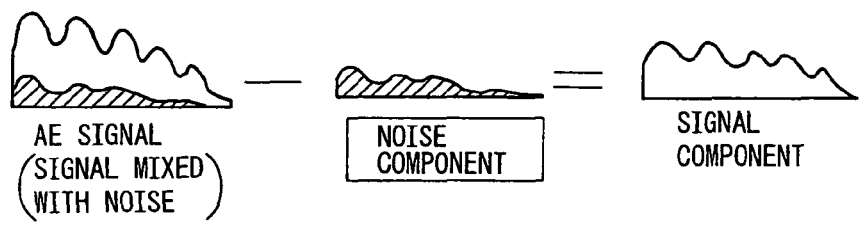
Figure 2:
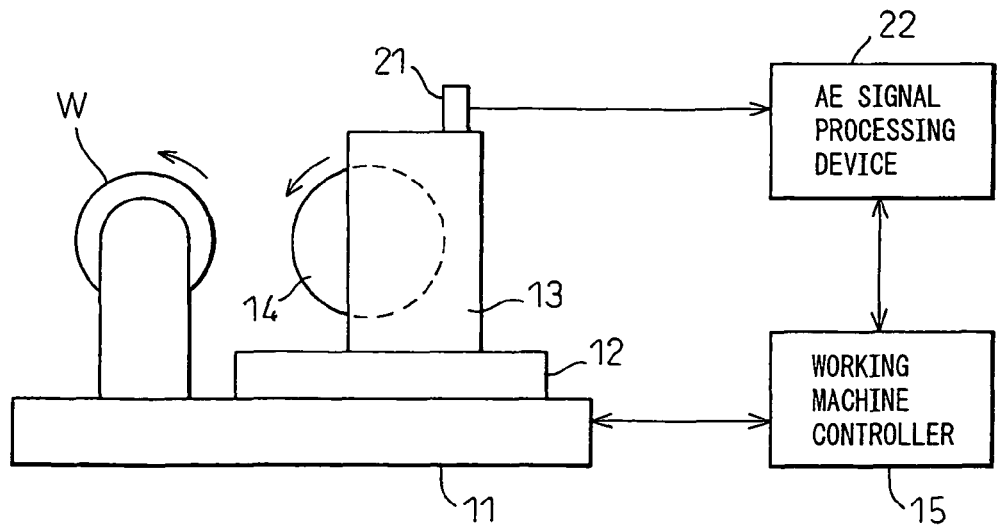
FIG. 2 is a diagram showing a general configuration of a working system in an embodiment of the present invention.

FIG. 2 is a diagram showing a general configuration of a working system including a grinder in an embodiment of the present invention. In FIG. 2, on a base 11, a mechanism for retaining and rotating a work W and a moving base 12 are provided. Moving base 12 is provided with a grindstone rotating mechanism 13 for rotating a grindstone 14. The grinder is controlled by a working machine controller 15. Grindstone 14 is subjected to processing called dressing processing for bringing the surface of grindstone 14 into a state suitable for grinding when it is replaced with a new one or it is used for a certain period of time. In this processing, the surface of rotating grindstone 14 is processed by causing a dresser to come into contact with rotating grindstone 14. The parts described above are the same as those of a system which includes a grinder.

An acoustic emission (AE) sensor 21 is attached to the housing of grind rotating mechanism 13, and an AE wave generated in grindstone 14 is transferred to AE sensor 21 through the housing of grindstone rotating mechanism 13, and then AE sensor 21 generates an AE signal. An AE signal processing device 22 processes the AE signal and detects that grindstone 14 has come into contact with work W and notifies working machine controller 15 of that.

Figure 3:
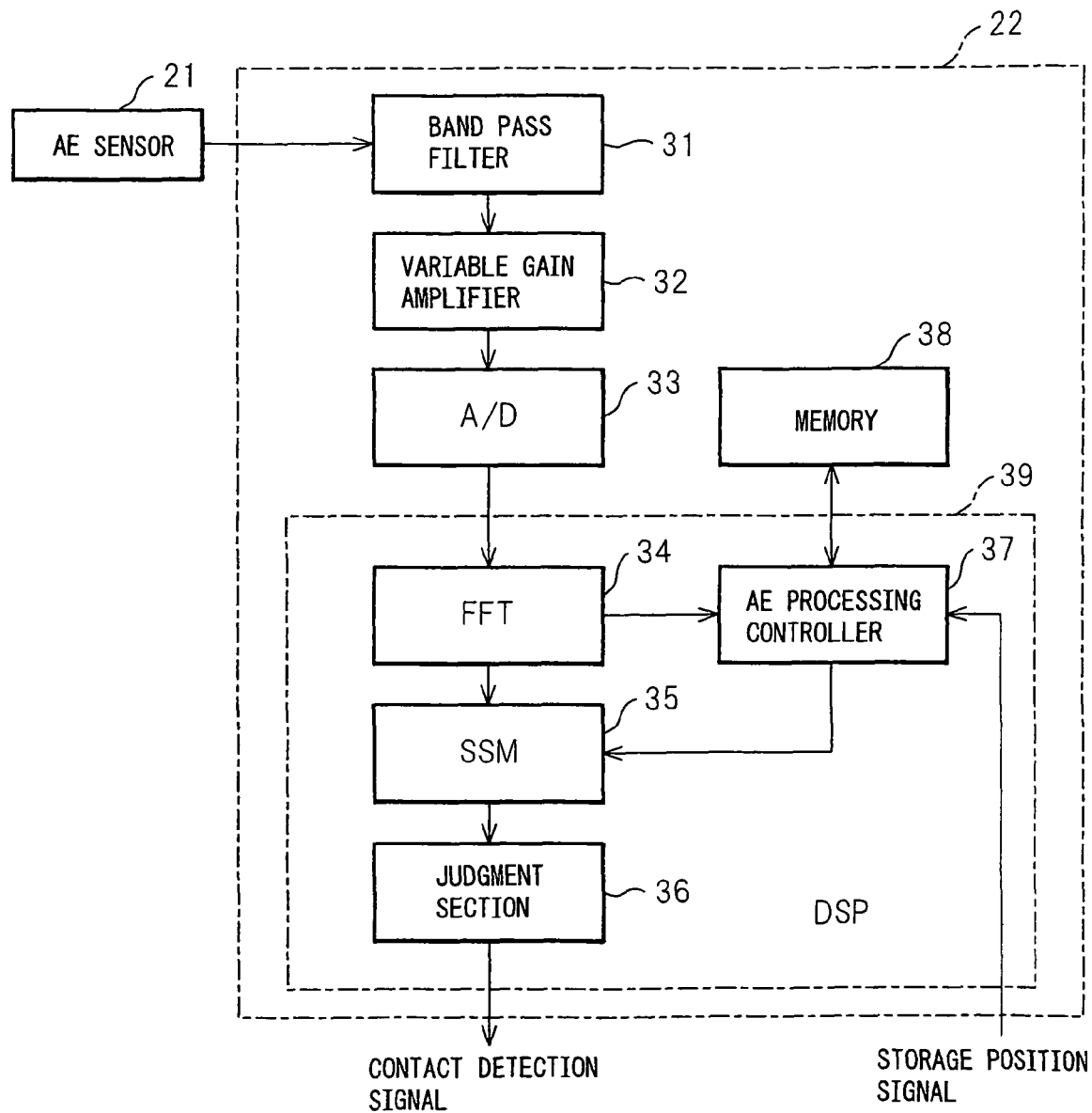
FIG. 3 is a diagram showing a configuration of an AE signal processing device.

FIG. 3 is a diagram showing a configuration of AE signal processing device 22. As shown schematically, AE signal processing device 22 has a band pass filter 31 for causing signals in a range of target frequencies of the AE wave, for example, a range of 20 kHz to 500 kHz among the analog AE signals output from AE sensor 21 to pass through and cutting off signals of other frequencies, a variable gain amplifier 32 for amplifying the signal having passed through band pass filter 31 to a predetermined power, an A/D converter 33 for converting the analog signal output from variable gain amplifier into a digital AE signal, a fast Fourier transformer (FFT) 34 for carrying out frequency analysis of the digital AE signal output from A/D converter 33, a spectrum subtraction method (SSM) for carrying out predetermined processing (subtraction processing and integral processing) of the frequency characteristics of the AE signal output from FFT 34, a judgment section 36 for judging whether the output from SSM 35 is greater than or equal to a predetermined value and outputs a contact detection signal when the output is greater than or equal to the predetermined value, an AE processing controller 37 for controlling FFT 34 and SSM 35, and a memory 38. FFT 34, SSM 35, judging section 36, and AE processing controller 37 are configured using a digital signal processor (DSP) 39 and memory 38 is an operation memory with which the DSP operates. DSP 39 receives a storage position signal from working machine controller 15 as well as outputting a contact detection signal to working machine controller 15. It is also possible to realize FFT 34, SSM 35, and judgment section 36 using a DSP and to realize AE processing controller 37 using a microcomputer, etc. Because the frequency analysis processing using a DSP is widely known, further explanation is omitted.

Figure 4:
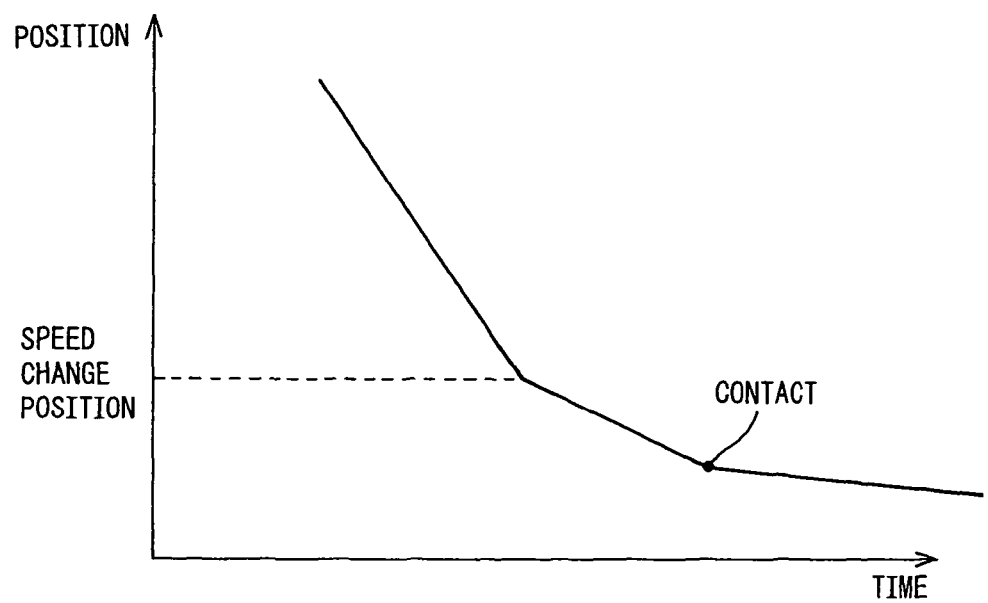
FIG. 4 is a diagram explaining a moving action when a contact is made.

FIG. 4 is a diagram explaining a moving operation when causing rotating grindstone 14 to come into contact with rotating work W for machining in the working system shown in FIG. 2. When machining, grindstone rotating mechanism 13 is moved on moving base 12. There may be a case where work W is moved relative to grindstone 14. In this case, the lower the relative moving speed of grindstone 14 with respect to work W, the more smoothly and accurately the surface of work W can be ground and the higher the relative moving speed, the coarser the surface of work W will become.

After grindstone rotating mechanism 13 is moved to a retracted position, work W is attached to the rotating mechanism and rotated, and then, grindstone rotating mechanism 13 is moved from the retracted position toward work W and the surface of rotating grindstone 14 is caused to come into contact with the surface of work W. At this time, if grindstone 14 (grindstone rotating mechanism 13) is moved relative to work W at a very low speed required for machining, it takes a long period of time for grindstone 14 to move from the retracted position until it comes into contact with work W, bringing about a problem that throughput of machining is low.

Therefore, as shown in FIG. 4, a position at which it is ensured that grindstone 14 does not come into contact with work W is set as a speed change position (first position) and grindstone 14 is moved from the retracted position to the speed change position at a high first speed and grindstone 14 is moved from the speed change position until it comes into contact with work W at a second speed lower than the first speed, and then, after the grindstone 14 comes into contact with work W, it is moved at a very low speed required for machining. When AE signal processing device 22 outputs a contact detection signal, working machine controller 15 changes the moving speed of grindstone rotating mechanism 13 from the second speed to the very low speed required for machining.

The speed change position is determined based on the initial shape of the work, the diameter of the grindstone, etc., in consideration of variations so that it is ensured that grindstone 14 does not come into contact with work W. If the speed change position is not appropriate, some problems will occur that grindstone 14 comes into contact with work W at a high speed to cause damage to work W that cannot be repaired, that an accident of the breakage of grindstone 14 occurs, that throughput is degraded considerably because it takes a long period of time from when grindstone 14 passes the speed change position until it comes into contact with work W, etc.

In the present embodiment, the setting is done so that when changing the moving speed of grindstone rotating mechanism 13 at the speed change position, working machine controller 15 outputs a storage position signal to AE processing controller 37 of AE signal processing device 22, and when receiving the storage position signal, AE processing controller 37 subtracts the non-contact frequency characteristics FFT 34 outputs at this point of time in SSM 35. Due to this, in SSM 35, the non-contact frequency characteristics when receiving the storage position signal are stored and afterward, the value, i.e. is, the frequency characteristics output from FFT 34 from which the non-contact frequency characteristics are subtracted, is output from SSM 35.

Figure 5:
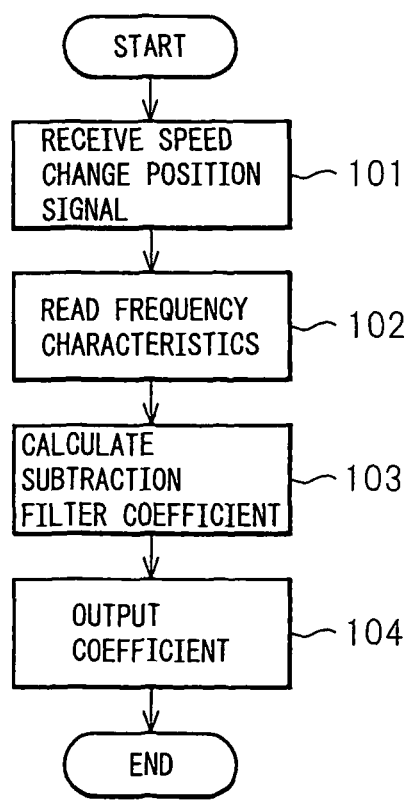
FIG. 5 is a flowchart showing the processing of an AE controller.

FIG. 5 is a flowchart showing the processing of AE processing controller 37. When the speed change position signal is received from working machine controller 15 in step 101, the frequency characteristics (non-contact frequency characteristics) at this point of time are read in step 102, and in step 103, a subtraction filter coefficient is calculated so that the non-contact frequency characteristics are subtracted and the sum of power in the target range is calculated in SSM 35. Then, in step 104, the calculated coefficient is set in SSM 35.

Figure 6A:
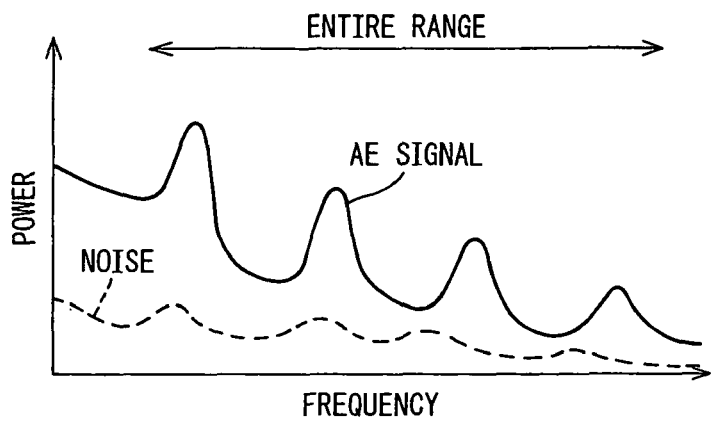
FIG. 6A to FIG. 6C are diagrams explaining an example of a operation/judging method based on the frequency characteristics.
Figure 6B:
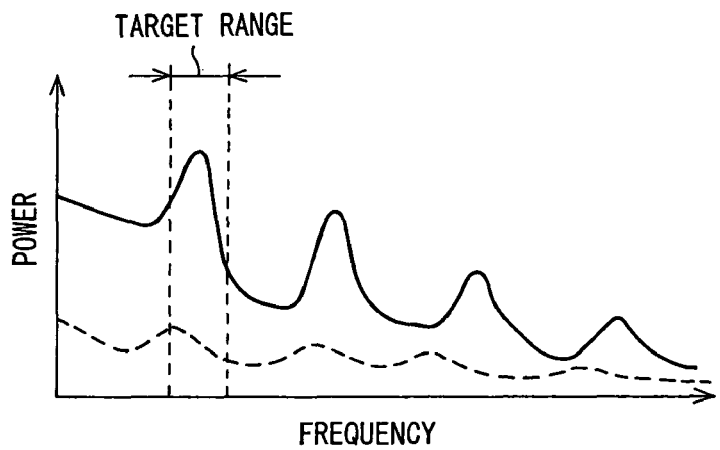

Next, the processing range of the frequency characteristics will be explained with reference to FIG. 6A to FIG. 6C.

As described above, in the AE signal from AE sensor 21, only the components in the target frequency range are left and the components of frequencies other than in the target frequency range are removed by band pass filter 31. Therefore, only these frequency components are a target of processing. It is assumed that noise components denoted by the broken line are mixed in the AE signal denoted by the solid line, as shown schematically. As shown in FIG. 6A, if the frequency characteristics are calculated with a predetermined sampling frequency pitch over the entire frequency range of the AE signal having passed through band pass filter 31, the frequency characteristics, which is the AE signal from which noises have been subtracted, can be obtained over the entire range of the target AE waves. When the sum value obtained by integrating the power over the entire range is greater than a predetermined value, the contact is judged to having been established.

As described above, if the frequency characteristics are calculated over the entire range, there is an advantage that the changes due to contacts that occur at various frequencies can be captured; however, there arise problems that the period of time required for calculation is increased because the amount of calculation increases when calculating the frequency characteristics over the entire range, that the cost is raised because it is necessary to use a high performance DSP, etc. Therefore, it may also be possible to limit the range in which the frequency characteristics are calculated to a narrow range as shown in FIG. 6B. In this case, a frequency range in which the change due to a contact is large is determined as a target range in advance based on experiments etc.

Figure 6C:
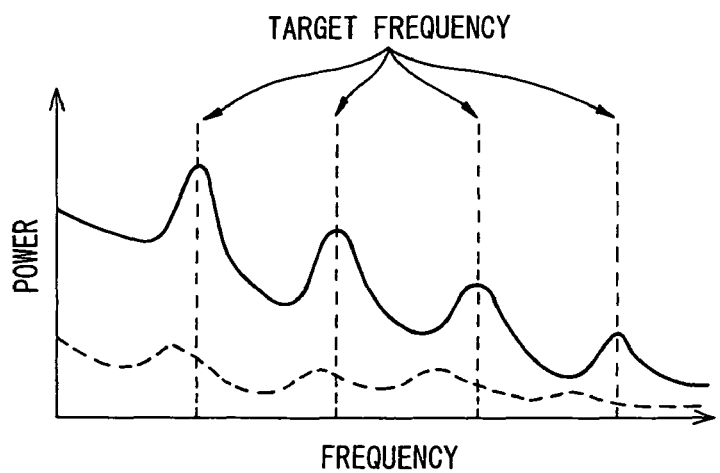

Further, as shown in FIG. 6C, it may also be possible to calculate the frequency characteristics of one or more frequencies. For example, the change of the AE signal due to the contact of grindstone 14 with work W is particularly large at a predetermined frequency and integer multiples thereof, and therefore, such frequencies are determined in advance based on experiments etc.

Although the embodiment of the present invention is described as above, there can be various modifications. For example, in the embodiment describes a case in which contact between the grindstone and the work occurs. However, the present invention can also be applied to the contact between the grindstone and the dresser and can also be applied to a lathe or milling machine, instead of the grinder having a grindstone.

Further, in the embodiment, the SSM is realized using a DSP and the subtraction of the non-contact frequency characteristics of the AE signal and the integration processing of the power in the target range are carried out. However, it may also be possible to cause a DSP to carry out only the frequency analysis (FTF) processing, to realize the AE processing controller using a microcomputer, and to cause the AE processing controller to carry out the storage and subtraction of the non-contact frequency characteristics and the integral processing of the power.

Furthermore, the position at which the AE sensor is provided may be any position provided the target AE wave can be detected, and this can also be applied to the case of the configuration described in patent document 1.

According to the present invention, the influence of noises from the surrounding environment are removed, it is made possible to more properly select an installation position of the AE sensor. The AE sensor for detecting a contact is required to change its output considerably when the grindstone comes into contact with the work or dresser. In other words, the position at which the output of the AE sensor does not change considerably is not suitable for an installation position. Therefore, conventionally, for the selection of an installation position of an AE sensor, an operator installs the AE sensor and selects a position at which the change is large while confirming the magnitude of the change of the output of the AE sensor before and after the contact by practically causing the grindstone to come into contact with the work or dresser. However, the conventional configuration has a problem that noses from the surrounding environment are large and the sufficient confirmation of the change of output of the AE sensor before and after the contact is difficult. In contrast to this, with the configuration of the present embodiment, noises from the surrounding environment are removed, and therefore, it is possible to confirm the change of output of the AE sensor before and after the contact more correctly.

Specifically, in the configuration of the present embodiment, the AE sensor is installed at an installation position and then the setting of the AE signal processor is done so that the frequency characteristics of the output of the AE sensor before the grindstone comes into contact with the work or dresser are calculated and subtracted. After this, the grindstone is caused to come into contact with the work or dresser to confirm the change of output of the AE signal processor. That the grindstone has come into contact with the work or dresser is visually confirmed by an operator or is confirmed by using various methods, such as a method for detecting the change of torque of a motor for rotating the grindstone or work. When the change of output is large, the AE sensor is installed at the position, and when the change of output is small, the installation position of the AE sensor is changed and a position at which the change of output is sufficiently large is sought.

In this way, it is possible to install the AE sensor at a proper position.

The present invention can be applied to any configuration provided an AE sensor is attached to a working machine therein, and it is possible to improve the detection precision by removing the influence of noises from the surrounding environment.

I claim:

1. A working system comprising:
a working device for working a work by causing a tool to come into contact with the work;
an AE sensor provided in the working device; and
an AE signal processing section for processing an AE signal output from the AE sensor, wherein:
the AE signal processor comprises:
an A/D converter for converting the AE signal into a digital signal;
a frequency analysis section for calculating the frequency characteristics of the digital AE signal;
a storage section for storing the frequency characteristics when the tool is not in contact with the work or tool dresser in the working device as non-contact frequency characteristics; and
a difference calculation section for calculating a difference between the frequency characteristics of the converted digital AE signal and the non-contact frequency characteristics.

2. The working system according to claim 1, wherein the AE signal processing section comprises a judgment section for judging that the tool has come into contact with the work or tool dresser based on the difference calculated by the difference calculation section and outputting a contact signal.

3. The working system according to claim 1, wherein:
the working device comprises a working controller;
the working controller controls, when causing the tool to come into contact with the work or tool dresser, the tool to move relative to the work or tool dresser at a first speed until it reaches a first position at which it is ensured that the tool does not come into contact with the work or tool dresser and then to move at a second speed lower than the first speed until it comes into contact with the work or tool dresser, and issues a storage position signal when the tool passes through the first position; and
the storage section of the AE processor section stores the non-contact frequency characteristics in accordance with the storage position signal.

4. The working system according to claim 2, wherein the judgment section calculates a difference signal by subtracting the non-contact frequency characteristics from the frequency characteristics of the detected digital AE signal at a corresponding frequency and outputs a contact signal when power of the calculated difference signal is greater than a predetermined value.

5. The working system according to claim 2, wherein the judgment section calculates a difference signal by subtracting the non-contact frequency characteristics from the frequency characteristics of the detected digital AE signal in a predetermined frequency range and outputs a contact signal when the power of the calculated difference signal is greater than a predetermined value.

6. The working system according to claim 2, wherein the judgment section calculates a difference signal by subtracting the non-contact frequency characteristics from the frequency characteristics of the detected digital AE signal at a predetermined frequency and outputs a contact signal when power of the calculated difference signal is greater than a predetermined value.

7. The working system according to claim 2, wherein the AE sensor is provided in the working device so that the difference calculated by the difference calculation section is sufficiently large when the tool comes into contact with the work or tool dresser.

8. The working system according to claim 2, wherein the frequency analysis section, the storage section, and the judgment section of the AE signal processing section are configured using a digital signal processor.

9. A contact detection method for detecting that a tool has come into contact with a work or tool dresser in a working device for machining the work by causing the tool to come into contact with the work, the method comprising:
converting an AE signal output from an AE sensor provided in the working device into the digital signal;
calculating frequency characteristics of a digital AE signal;
storing the frequency characteristics when the tool is not in contact with the work or tool dresser as non-contact frequency characteristics; and
calculating a difference between the frequency characteristics of converted digital AE signal and the non-contact frequency characteristics.

10. The method according to claim 9, wherein that the tool has come into contact with the work or tool dresser is detected based on the calculated difference.

11. The method according to claim 9, wherein:
when the tool is caused to come into contact with the work or tool dresser, the tool is controlled to move relative to the work or tool dresser at a first speed until it reaches a first position at which it is ensured that the tool does not come into contact with the work or tool dresser, and then to move at a second speed lower than the first speed until it comes into contact with the work or tool dresser; and
the frequency characteristics of the digital AE signal and the non-contact frequency characteristics when the tool passes through the first position are stored.

12. The method according to claim 10, wherein:
the difference between the frequency characteristics of the detected digital AE signal and the non-contact frequency characteristics is calculated by subtracting the non-contact frequency characteristics from the frequency characteristics of the detected digital AE signal at a corresponding frequency; and
when power of the calculated difference is greater than a predetermined value, the contact is judged to have been established.

13. The method according to claim 10, wherein:
the difference between the frequency characteristics of the detected digital AE signal and the non-contact frequency characteristics is calculated by subtracting the non-contact frequency characteristics from the frequency characteristics of the detected digital AE signal in a predetermined frequency range; and
when power of the calculated difference is greater than a predetermined value, the contact is judged to have been established.

14. The method according to claim 10, wherein:
the difference between the frequency characteristics of the detected digital AE signal and the non-contact frequency characteristics is calculated by subtracting the non-contact frequency characteristics from the frequency characteristics of the detected digital AE signal at a predetermined frequency; and
when power of the calculated difference is greater than a predetermined value, the contact is judged to have been established.

15. The method according to claim 10, wherein the AE sensor is provided in the working device so that the difference to be calculated is sufficiently large when the tool comes into contact with the work or tool dresser.

16. The method according to claim 10, wherein the calculation of the frequency characteristics, the storage of the non-contact frequency characteristics, and the detection of establishment of the contact are carried out by a digital signal processor.

17. An AE contact detection device to be attached to a working device for working a work by causing a tool to come into contact with the work, the device comprising:
an AE sensor provided in the working device; and
an AE signal processing section for processing an AE signal output from the AE sensor, wherein the AE signal processing section comprise:
an A/D converter for converting the AE signal into a digital signal;
a frequency analysis section for calculating the frequency characteristics of the digital AE signal;
a storage section for storing the frequency characteristics when the tool is not in contact with the work or tool dresser in the working device as non-contact frequency characteristics; and
a difference calculation section for calculating a difference between the frequency characteristics of the digital AE signal and the non-contact frequency characteristics.

18. The AE contact detection device according to claim 17, wherein the AE signal processing section comprises a judgment section for outputting a contact signal by judging that the tool has come into contact with the work or tool dresser based on the difference.

19. The AE contact detection device according to claim 17, wherein the storage section stores the non-contact frequency characteristics in response to a signal from the working device.

20. The AE contact detection device according to claim 18, wherein the judgment section calculates a difference signal by subtracting the non-contact frequency characteristics from the frequency characteristics of the detected digital AE signal at a corresponding frequency and outputs a contact signal when the power of the calculated difference signal is greater than a predetermined value.

21. The AE contact detection device according to claim 18, wherein the judgment section calculates a difference signal by subtracting the non-contact frequency characteristics from the frequency characteristics of the detected digital AE signal in a predetermined frequency range and outputs a contact signal when the power of the calculated difference signal is greater than a predetermined value.

22. The AE contact detection device according to claim 18, wherein the judgment section calculates a difference signal by subtracting the non-contact frequency characteristics from the frequency characteristics of the detected digital AE signal at a predetermined frequency and outputs a contact signal when the power of the calculated difference signal is greater than a predetermined value.

23. The AE contact detection device according to claim 18, wherein the frequency analysis section, the storage section, and the judgment section of the AE signal processing section are configured using a digital signal processor.

* * * * *